United States Patent
Werner (10) Patent No.: US 9,280,260 B2
(45) Date of Patent: Mar. 8, 2016

(54) PROVISION OF A GRAPHICAL LAYOUT OF SEMI-STRUCTURED DATA BASED ON PROPERTIES OF THE SEMI-STRUCTURED DATA AND USER INPUT

(75) Inventor: Horst Werner, Muehlhausen-Rettigheim (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 12/961,178

(22) Filed: Dec. 6, 2010

(65) Prior Publication Data

US 2012/0144326 A1  Jun. 7, 2012

(51) Int. Cl.
*G06F 3/0481* (2013.01)
*G06F 3/0486* (2013.01)

(52) U.S. Cl.
CPC .......... *G06F 3/04817* (2013.01); *G06F 3/0481* (2013.01); *G06F 3/0486* (2013.01)

(58) Field of Classification Search
CPC . G06F 3/04817; G06F 9/4443; G06F 3/0481; G06F 3/0486
USPC ........................... 715/763, 235; 707/798, 752
See application file for complete search history.

(56) References Cited

U.S. PATENT DOCUMENTS

| | | | |
|---|---|---|---|
| 5,812,128 A * | 9/1998 | Sterling, IV | 715/762 |
| 6,426,761 B1 * | 7/2002 | Kanevsky et al. | 715/788 |
| 7,721,195 B2 * | 5/2010 | Jiang et al. | 715/235 |
| 2008/0065596 A1 * | 3/2008 | Shadmon et al. | 707/2 |
| 2009/0241058 A1 * | 9/2009 | Costello et al. | 715/784 |
| 2011/0066937 A1 * | 3/2011 | Loeser | 715/241 |

FOREIGN PATENT DOCUMENTS

WO    WO 2011/142720 A1 * 11/2011 ............. G06F 3/048

OTHER PUBLICATIONS

Spoenemann, Miro, "On the Automatic Layout of Data Flow Diagrams", (Mar. 19, 2009), 99 pages.

\* cited by examiner

*Primary Examiner* — Jennifer To
*Assistant Examiner* — Li Sun
(74) *Attorney, Agent, or Firm* — Schwegman Lundberg & Woessner, P.A.

(57) ABSTRACT

In an embodiment, a method is provided for organizing semi-structured data having properties. In this method, the semi-structured data are accessed and rendered on a graphical user interface. A user input defining a first graphical layout of a first subset of the semi-structured data is received. A second subset of the semi-structured data is identified as having properties similar to the properties of the first subset of the semi-structured data. A second graphical layout of the second subset of the semi-structured data is then provided. The second graphical layout matches the first graphical layout.

17 Claims, 10 Drawing Sheets

PROVISION OF A GRAPHICAL LAYOUT OF SEMI-STRUCTURED DATA BASED ON PROPERTIES OF THE SEMI-STRUCTURED DATA AND USER INPUT

FIELD

The present disclosure relates generally to data visualization. In an example embodiment, the disclosure relates to graphical layout of semi-structured data.

BACKGROUND

Currently, users access a variety of different applications that provide the users with a large amount of data to digest. One type of data that is often presented to the users is semi-structured data that have properties similar to structured data, but these properties cannot be predicted by means of a predefined schema. Semi-structured data are often used in the Web, the data exchange of which cannot be constrained by a schema. Particularly, semi-structured data provide a flexible format for data exchange between, for example, disparate databases. Semi-structured data therefore cannot be managed by a predefined schema. Without a predefined schema, users may have a more difficult time reading and understanding semi-structured data when compared to structured data.

To make semi-structured data more easily understood, applications can visually present the semi-structured data in graphical form by applying various generic layout algorithms to the semi-structured data. For example, an application can apply a particular layout algorithm to generate a force directed graph of semi-structured data. However, all these generic layout algorithms produce predefined graphical layouts of semi-structured data, and many users may not find that such predefined graphical layouts are easy to understand.

SUMMARY

In one example, a method of organizing semi-structured data is provided. In this method, semi-structured data that have properties are accessed. The semi-structured data are rendered on a graphical user interface and a user input defining, from the graphical user interface, a first graphical layout of a first number of the semi-structured data is received. A second number of the semi-structured data having properties similar to the properties of the first number of the semi-structured data is identified. A second graphical layout of the identified second number of the semi-structured data is rearranged to match the first graphical layout. In one example, the identification of the second number of the semi-structured data comprises: associating the first number of the semi-structured data with a data model of a frame that comprises slots, each slot having a constraint based on at least one of the properties; searching within the semi-structured data for at least one semi-structured data having a property that meets the constraint of the each slot; and assigning the at least one semi-structured data that meets the constraint to the each slot. In one example, the properties define an association between the semi-structured data, and wherein the searching within the semi-structured data comprises following the association to locate at least one of the semi-structured data. In one example, the rearrangement of the second graphical layout comprises: identifying, from the first graphical layout, relative positions between a first number of graphical items that represents the first number of the semi-structured data; and positioning, in the second graphical layout, a second number of graphical items that represents the second number of semi-structured data to correspond to the identified relative positions. In one example, the properties define an association between the first number of the semi-structured data. Here, the method further comprises rendering a graphical representation of the association between the identified second number of the semi-structured data. In one example, the semi-structured data are rendered in a graphical layout that is different from the first graphical layout. In one example, the semi-structured data comprise Extensible Markup Language (XML) data. In one example, the first and second graphical layouts comprise graphical items that represent the first and second numbers of the semi-structured data.

In one example, a non-transitory machine-readable medium that stores instructions is provided. The instructions, when performed by a machine, cause the machine to perform operations comprising: accessing semi-structured data that have properties; rendering the semi-structured data on a graphical user interface; receiving a user input defining, from the graphical user interface, a first graphical layout of a first number of the semi-structured data; identifying a second number of the semi-structured data having properties similar to the properties of the first number of the semi-structured data; and rearranging a second graphical layout of the identified second number of the semi-structured data to match the first graphical layout. In one example, the identification of the second number of the semi-structured data comprises: associating the first number of the semi-structured data with a data model of a frame that comprises slots, each slot having a constraint based on at least one of the properties; searching within the semi-structured data for at least one semi-structured data having a property that meets the constraint of the each slot; and assigning the at least one semi-structured data that meets the constraint to the each slot. In one example, the properties define an association between the semi-structured data, and wherein the searching within the semi-structured data comprises following the association to locate at least one of the semi-structured data. In one example, the rearrangement of the second graphical layout comprises: identifying, from the first graphical layout, relative positions between a first number of graphical items that represents the first number of the semi-structured data; and positioning, in the second graphical layout, a second number of graphical items that represents the second number of semi-structured data to correspond to the identified relative positions. In one example, the properties define an association between the first number of the semi-structured data. Here, the method further comprises rendering a graphical representation of the association between the identified second number of the semi-structured data.

In one example, a computing device is provided. This computing device comprises at least one processor and a memory in communication with the at least one processor. The memory is configured to store a data exploration module that is executable by the at least one processor. The data exploration module has instructions that when executed by the at least one processor, cause operations to be performed. Such operations comprise accessing semi-structured data that have properties; rendering the semi-structured data on a graphical user interface; receiving a user input defining, from the graphical user interface, a first graphical layout of a first number of the semi-structured data; identifying a second number of the semi-structured data having properties similar to the properties of the first number of the semi-structured data; and rearranging a second graphical layout of the identified second number of the semi-structured data to match the first graphical layout. In one example, the identification of the second number of the semi-structured data comprises: associating the first number of the semi-structured data with a data model of a frame that comprises slots, each slot having a constraint based on at least one of the properties; searching within the semi-structured data for at least one semi-structured data having a property that meets the constraint of the each slot; and assigning the at least one semi-structured data that meets the constraint to the each slot. In one example, the properties define an association between the semi-structured data, and wherein the searching within the semi-structured data comprises following the association to locate at least one of the semi-structured data. In one example, the rearrangement of the second graphical layout comprises: identifying, from the first graphical layout, relative positions between a first number of graphical items that represents the first number of the semi-structured data; and positioning, in the second graphical layout, a second number of graphical items that represents the second number of semi-structured data to correspond to the identified relative positions. In one example, the properties define an association between the first number of the semi-structured data, the method further comprising rendering a graphical representation of the association between the identified second number of the semi-structured data. In one example, the semi-structured data are a form of data having an irregular schema.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for organizing semi-structured data in a graphical layout. In one example, semi-structured data are rendered on a graphical user interface, and a user can define a particular graphical layout of a subset of the semi-structured data within the graphical user interface. As explained in more detail below, all the other semi-structured data having similar properties are then rearranged to match the particular graphical layout defined by the user.

Figure 1:
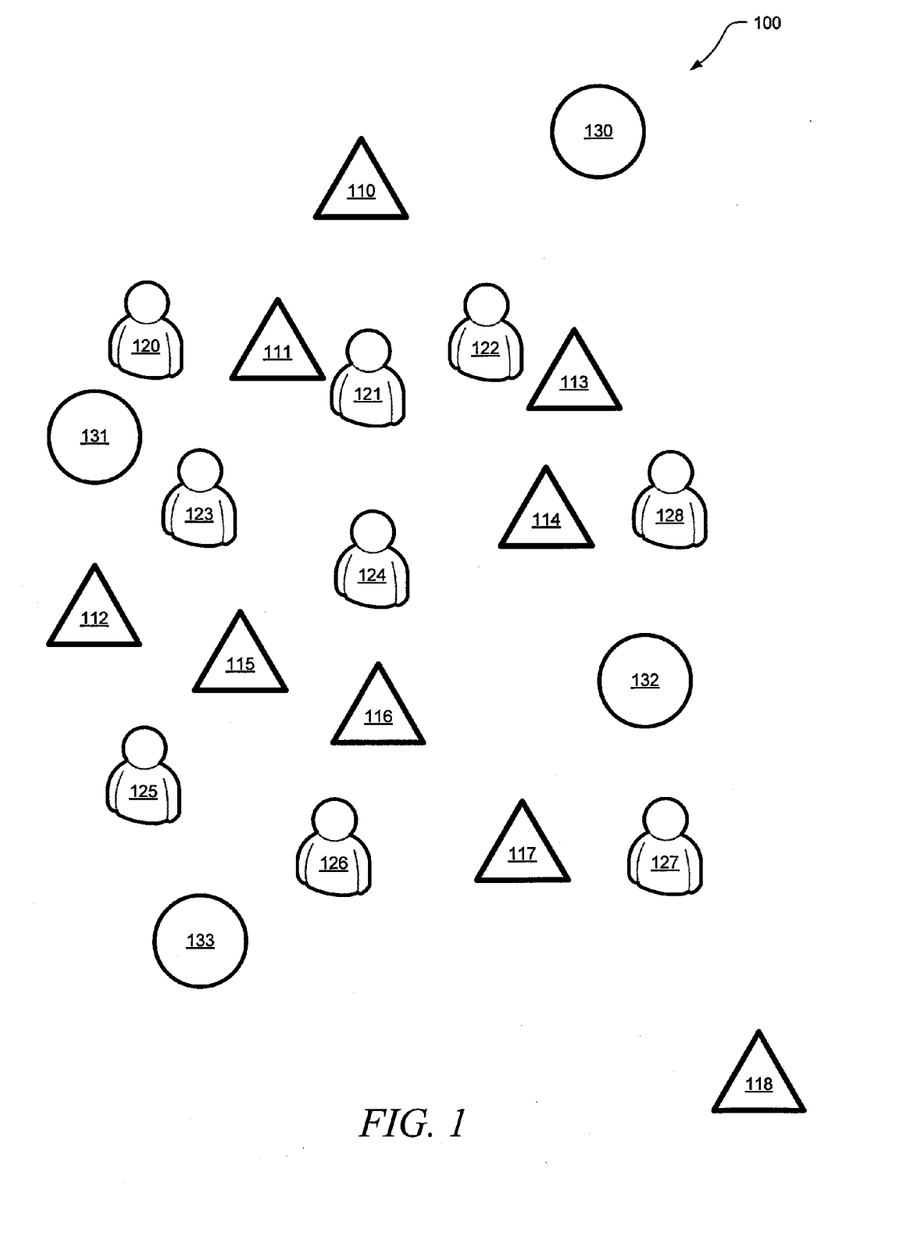
FIG. 1 is a diagram depicting a rendering of semi-structured data on a graphical user interface, consistent with one example embodiment.

FIG. 1 is a diagram depicting a rendering of semi-structured data on a graphical user interface 100, consistent with one example embodiment. Generally, "semi-structured data," as used herein, refer to a form of data that have no fixed schema (or structure), but their schema is implicit and irregular. In other words, semi-structured data are a form of data that do not conform with the formal structure of tables and data models associated with relational databases. In contrast, structured data have a predefined schema. Semi-structured data have properties, which is described in more detail below, but these properties may not be defined by a predefined schema (or predefined data structure). Particularly, semi-structured data can have a schema, but such schema is not known in advance and can be different for each instance. In one example, semi-structured data may include tags or other markers to separate semantic elements and hierarchies of records and fields within the data. In one form, information that is normally associated with a schema is instead included within the data, which is called "self-describing." In another form, a schema can exist but it places loose constraints on the semi-structured data. Examples of semi-structured data include email messages and markup languages, such as Extensible Markup Language (XML), Extensible HyperText Markup Language (XHTML), and HyperText Markup Language (HTML). It should be noted that semi-structured data can include a value, a variable, a function, a data structure, or other semi-structured data that represent, quantify, or embody any suitable thing. As an example, a physical thing (e.g., a car, a person, or a computer) may be defined or embodied in semi-structured data. In another example, an object of thought or concept (e.g., a business plan or an architectural design) may also be defined or embodied in semi-structured data. In yet another example, a non-tangible thing (e.g., work to be done or video file) may also be defined or embodied in semi-structured data.

As depicted in FIG. 1, semi-structured data 110-118, 120-128, and 130-133 can be visualized as graphical items. In other words, the semi-structured data 110-118, 120-128, and 130-133 can be rendered as or represented by one or more graphical items in the graphical user interface 100. The graphical items are images having a variety of different shapes, colors, and sizes. For example, semi-structured data 110 can be represented by a graphical item in the form of a triangle while semi-structured data 132 can be represented by a different graphical item in the form of a circle.

In the example graphical user interface 100, the graphical layout of the semi-structured data 110-118, 120-128, and 130-133 is such that the semi-structured data are positioned randomly. As used herein, a "graphical layout" refers to an arrangement of graphical items that represents the semi-structured data, as rendered graphically on a display. Given that the structured data are positioned randomly on the example graphical user interface 100, it may be difficult for a user to visually identify from the graphical layout of the semi-structured data 110-118, 120-128, and 130-133 any particular relationships between the semi-structured data or any discernible patterns. However, in the graphical user interface 100, a user may define a particular graphical layout for a number of semi-structured data based on the user's own preferences. As explained in more detail below, techniques are described below that automatically rearrange the graphical layouts of all the other semi-structured data to match the graphical layout defined by the user.

Figure 2:
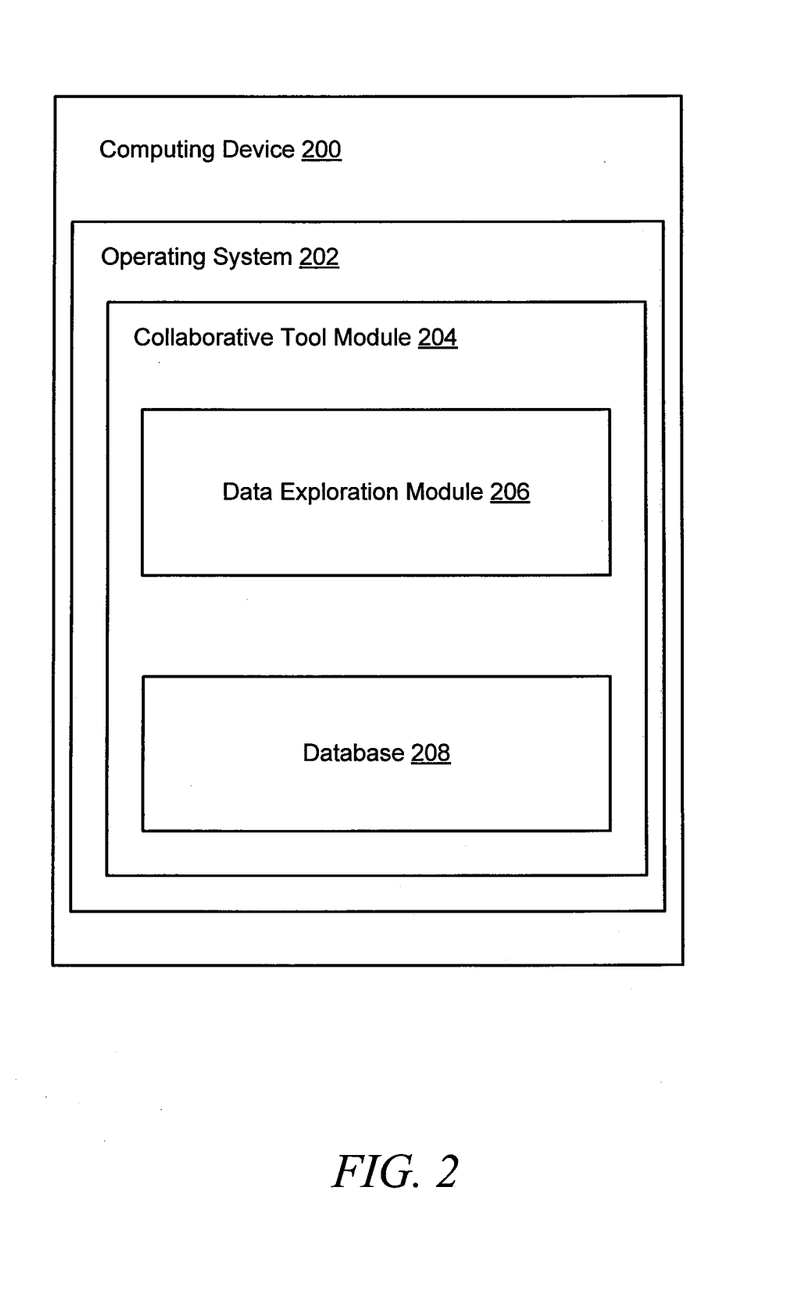
FIG. 2 is a block diagram depicting a data exploration module, consistent with an example embodiment, that is embodied in a computing device.

FIG. 2 is a block diagram depicting a data exploration module 206, consistent with an example embodiment, that is embodied in a computing device 200. It should be appreciated that the computing device 200 may be deployed in the form of, for example, a personal computer, a laptop computer, a server computer, a tablet personal computer, a smart phone, a personal digital assistant, or other computing devices. In various embodiments, the computing device 200 may be used to implement computer programs, logic, applications, methods, processes, or software to organize the semi-structured data, as described in more detail below.

In the example depicted in FIG. 2, the computing device 200 executes an operating system 202 that manages other software processes and/or services executing on the computing device 200. In one embodiment, the software processes and/or services may include a collaborative tool module 204, which allows users to share documents and other data and provides various structure and tools used in brainstorming and decision making processes. Here, the collaborative tool module 204 may include a data exploration module 206 and a database 208 that is configured to or structured to store, in one embodiment, semi-structured data and properties associated with the semi-structured data. A "property," as used herein, refers to a characteristic of semi-structured data. In one example, the property refers to an association and an attribute. An "association" refers to a connection between two or more semi-structured data. For example, a particular semi-structured object may include a tag that identifies or points to a different semi-structured object. The tag may include a variety of different identifiers, such as a name of the different semi-structured object or a pointer to the different semi-structured object. An "attribute" refers to a quality or feature belonging to one or more semi-structured data. Examples of attributes include size, shape, color, category, and other attributes. It should be appreciated that in addition to the database 208, the semi-structured data and their properties may also be stored in other files, such as an Extensible Markup Language (XML) document, spreadsheet, and other files.

The data exploration module 206 provides a graphical user interface that functions to provide a user with the ability to manipulate semi-structured data and/or properties of the semi-structured data, as stored in the database 208. For example, as explained in more detail below, the data exploration module 206 can display representations of semi-structured data in the form of graphical items, such as the graphical items depicted in FIG. 1, and through interactions with these graphical items, one or more users in a collaborative session using the collaborative tool module 204 can define the graphical layout of semi-structured data.

In addition to the collaborative tool module 204, the data exploration module 206 may be embodied in a variety of other applications or services. In another example embodiment, the data exploration module 206 may be embodied within a molecular modeling software for use in, for example, visualizing molecules. In an alternate example embodiment, the data exploration module 206 may be embodied within an investigative case management application for use in, for example, detecting patterns from various crime related data. Accordingly, it should be appreciated that in other embodiments, the computing device 200 may include fewer, more, or different modules apart from those shown in FIG. 2. For example, in yet another embodiment, the database 208 may be excluded from the collaborative tool module 204. Instead, the database 208 may be stored at a different computing device or storage system.

Figure 3:
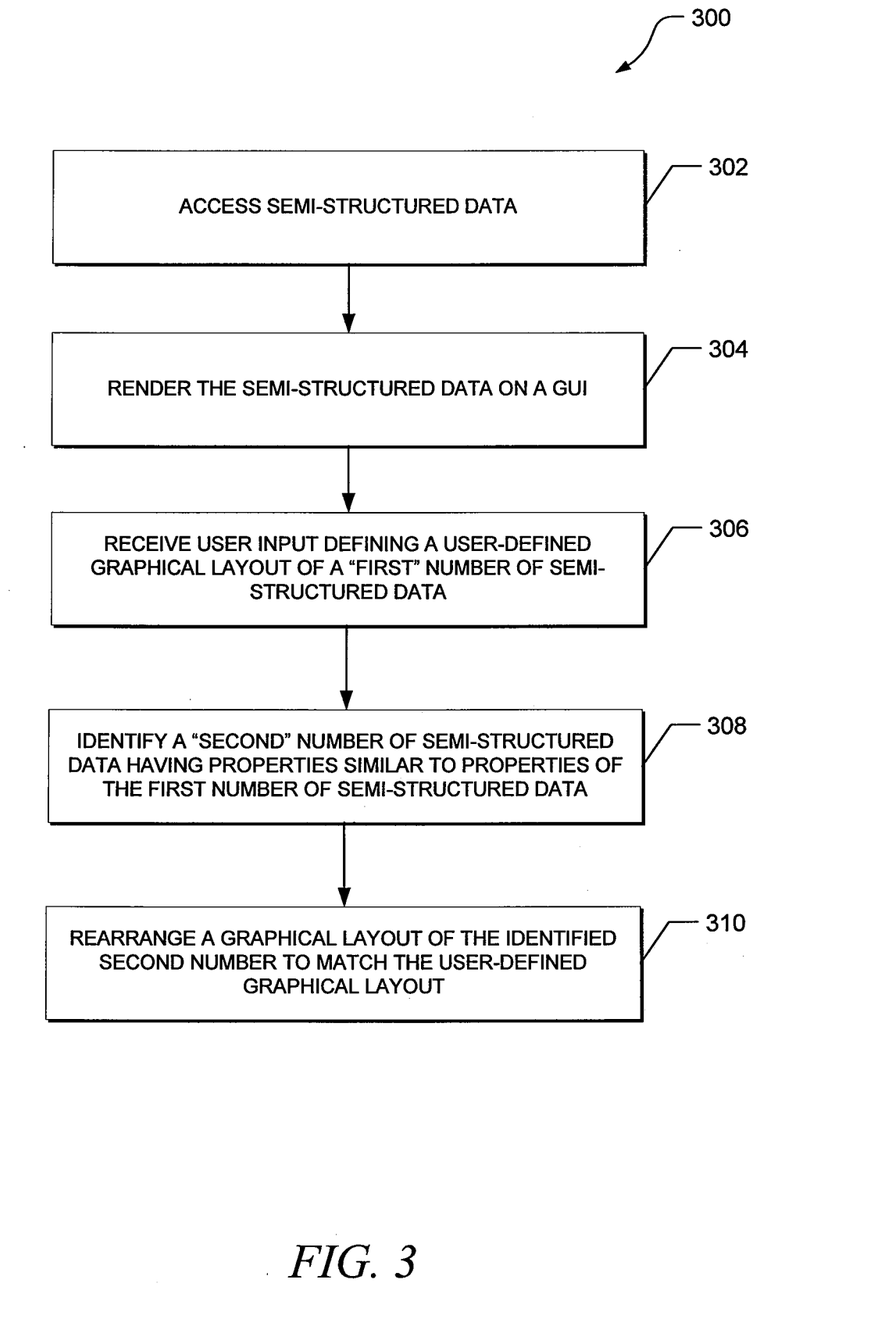
FIG. 3 depicts a flow diagram of a general overview of a method, in accordance with an example embodiment, for organizing semi-structured data in a graphical layout.

FIG. 3 depicts a flow diagram of a general overview of a method 300, in accordance with an example embodiment, for organizing semi-structured data in a graphical layout. In an example embodiment, the method 300 may be implemented by the data exploration module 206 and employed in the computing device 200 depicted in FIG. 2. Referring to FIG. 3, the data exploration module, for example, accesses the semi-structured data at 302 from, for example, a database or other data sources. The semi-structured data is then rendered at 304 on a graphical user interface. As illustrated in FIG. 1, the semi-structured data is represented by graphical items, which are rendered or displayed in the graphical user interface.

Using the graphical user interface, a user can define a graphical layout (referred herein as "user-defined" graphical layout) of a number of semi-structured data (referred herein as a "first" number of semi-structured data). Particularly, the user can define the user-defined graphical layout by repositioning the first number of semi-structured data in a particular pattern of his preference. The user can reposition the first number of semi-structured data using a variety of input methodologies, such as by dragging the graphical items with a mouse to new positions or by inputting the coordinates of the graphical items by way of a keyboard.

At 306, the data exploration module receives this user input defining the user-defined graphical layout. Upon receipt of the user input, the data exploration module identifies a different number of semi-structured data (or referred herein as a "second" number of semi-structured data) that have properties similar to properties of the first number of semi-structured data. Two or more properties can be similar to each other based on a variety of different constraints. In one example embodiment, one property can be identified as similar to another property if the properties are identical. For example, a number of semi-structured data can have identical attributes and/or associations. In another example embodiment, one property can be identified as similar to another property if the properties fall within a certain range. For example, a number of semi-structured data can be identified as similar if they have attribute values that fall within a predefined range. In yet another example embodiment, one property can be identified as similar to another property if the properties share a common characteristic. For example, a number of semi-structured data can be similar because they have attributes comprised of words having the same or nearly the same meaning. As explained in detail below, the identification of similar properties can be based on the application of constraints to filter the semi-structured data.

Still referring to FIG. 3, with this second number of semi-structured data identified, the graphical layout of the second number of semi-structured data may then be rearranged to match the user-defined graphical layout. This process is repeated until all other semi-structured data having similar properties are identified and their graphical layouts are then reorganized accordingly to match the user-defined graphical layout.

Figure 4A:
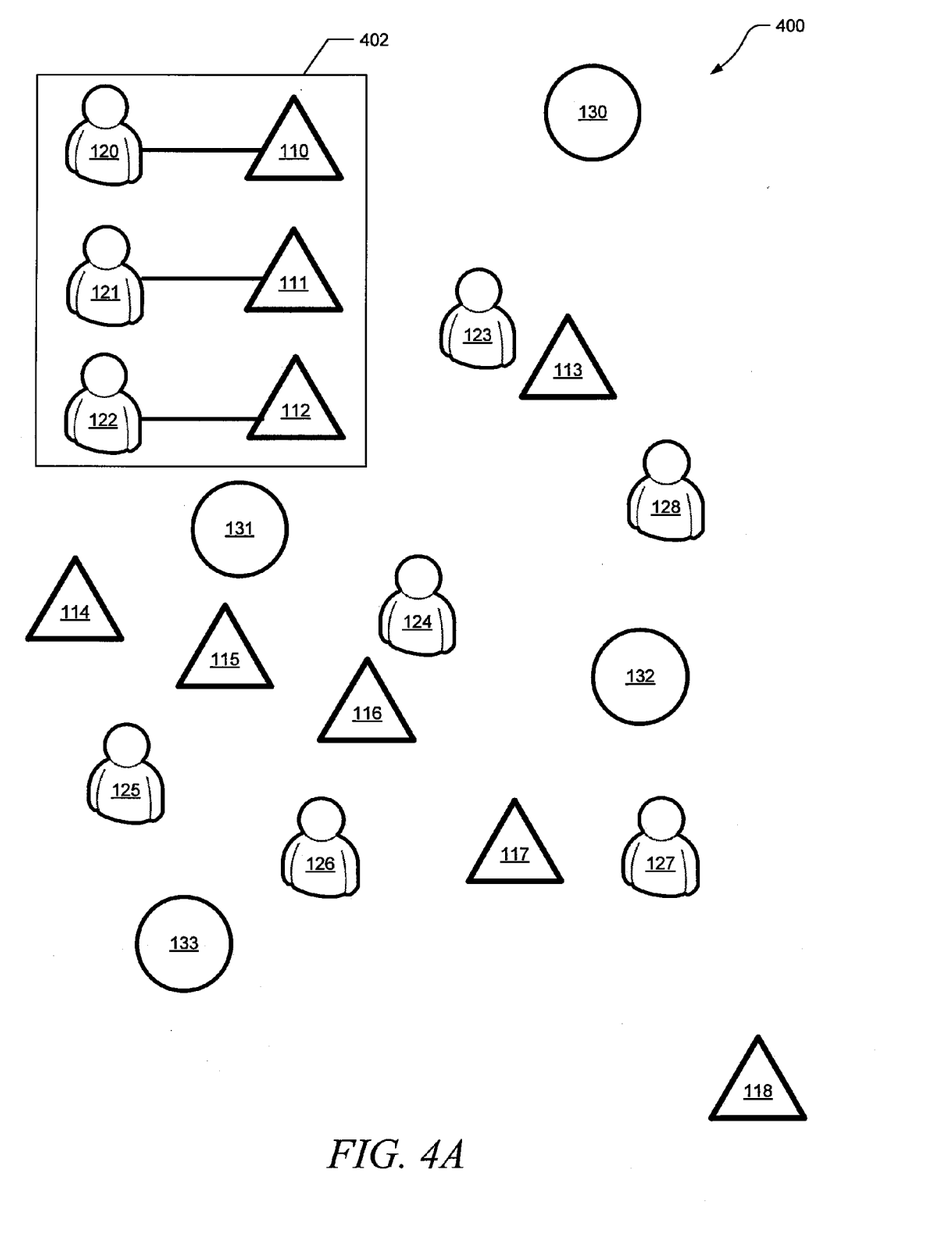
FIGS. 4A and 4B are graphical user interfaces illustrating the automatic organization of semi-structured data based on a user-defined graphical layout, consistent with one example embodiment.
Figure 4B:
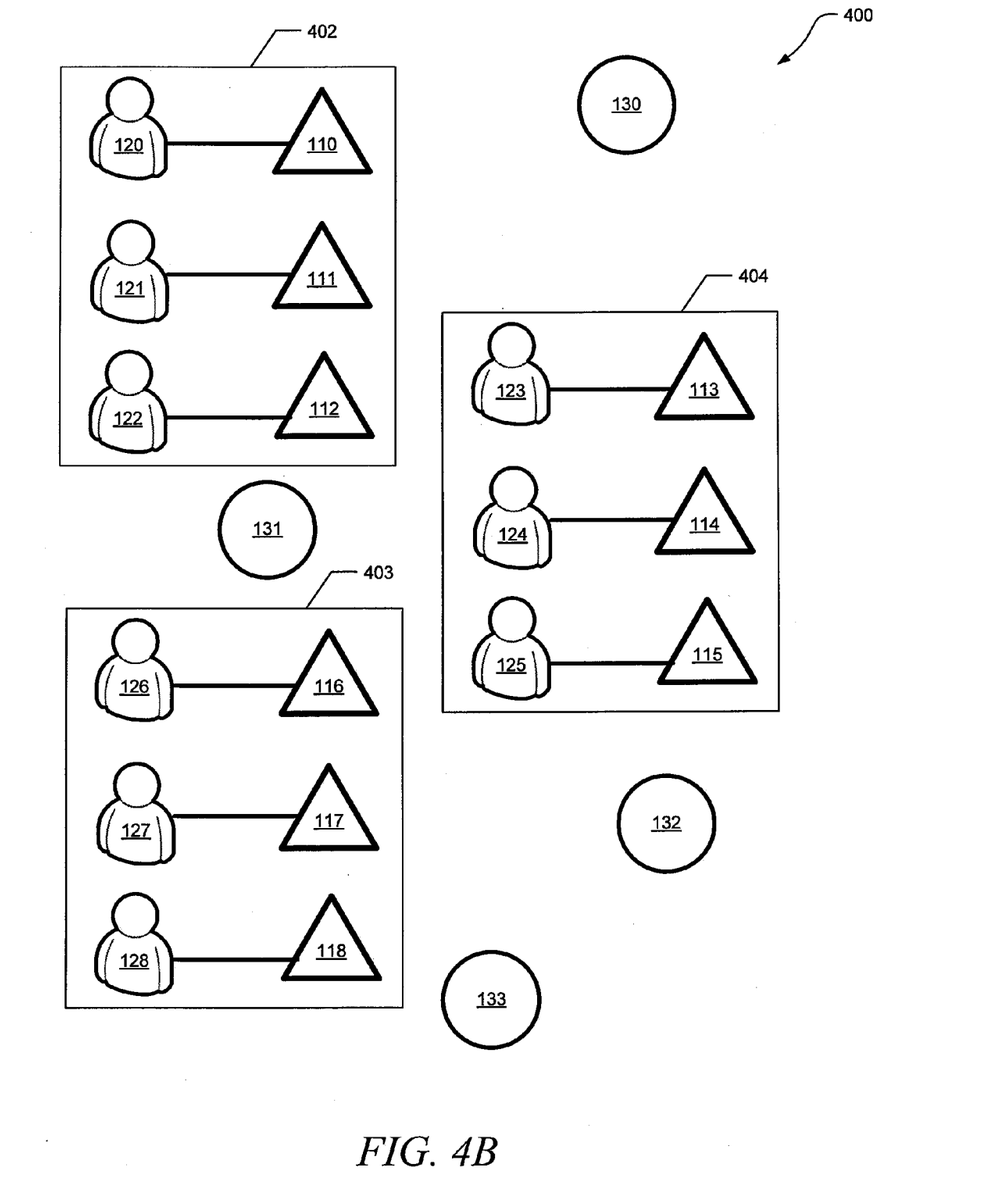

FIGS. 4A and 4B are graphical user interfaces 400 illustrating the automatic organization of semi-structured data based on a user-defined graphical layout, consistent with one example embodiment. As depicted in FIG. 4A, semi-structured data 110-118, 120-128, and 130-133 are represented by graphical items in a graphical user interface 400. Initially, the graphical layout of the semi-structured data 110-118, 120-128, and 130-133 is such that the semi-structured data 110-118, 120-128, and 130-133 are randomly positioned. However, a user using the graphical user interface 400 can define a particular graphical layout 402 of a number of semi-structured data. In this example, the user can reposition the semi-structured data 110-112 and 120-122 such that they are aligned along three rows and two columns, as depicted in the graphical layout 402. A user may define this particular graphical layout 402 because, for example, the user may be able to more easily identify particular associations between semi-structured data 110-112 and 120-122 or easily identify patterns within the semi-structured data 110-112 and 120-122 using this graphical layout 402.

In addition to repositioning semi-structured data 110-112 and 120-122, the user may further define associations between this selected number of semi-structured data 110-112 and 120-122, consistent with an example embodiment. As depicted in FIG. 4A, the user may define an association between semi-structured data 110 and 120, between semi-structured data 111 and 121, and between semi-structured data 112 and 122. The lines connecting the semi-structured data 110 and 120, 111 and 121, and 112 and 122 are graphical representations of the associations between the semi-structured data 110 and 120, 111 and 121, and 112 and 122.

With the receipt of the user input, which defines the graphical layout 402, a number of other semi-structured data 126-128, 116-118, 123-125, and 113-115 are identified as having similar properties as the semi-structured data 110-112 and 120-122 defined in the user input.

Upon identification of this other number of semi-structured data 126-128, 116-118, 123-125, and 113-115, the data exploration module, for example, then rearranges the graphical layouts of these semi-structured data 126-128, 116-118, 123-125, and 113-115 to match the graphical layout 402 of the semi-structured data 120-122 and 110-112 defined in the user input. In the rearrangement, the relative positions between the graphical items representing the number of semi-structured data 110-112 and 120-122 are identified. As depicted in FIG. 4B, the graphical items representing semi-structured data 126-128, 116-118, 123-125, and 113-115 are then positioned to correspond to the relative positions such that the graphical layouts 403 and 404 of semi-structured data 126-128, 116-118, 123-125, and 113-115 match the user-defined graphical layout 402.

In a further embodiment, associations between the semi-structured data 110-112 and 120-122 are stored as properties of the semi-structured data 110-112 and 120-122. The data exploration module, which can access such properties, can render graphical representations of the associations between these other number of semi-structured data 126-128, 116-118, 123-125, and 113-115 to match the associations between semi-structured data 110-112 and 120-122. In the embodiment depicted in FIG. 4B, the graphical representations are lines connecting the semi-structured data 110-112, 120-122, 126-128, 116-118, 123-125, and 113-115.

As a result, by simply defining the graphical layout 402 of a relatively small subset of semi-structured data 110-112 and 120-122, the data exploration module can automatically organize all other semi-structured data 126-128, 116-118, 123-125, and 113-115 having similar properties to match the graphical layout 402. As a result, almost all of the semi-structured data 110-112, 120-122, 126-128, 116-118, 123-125, and 113-115 are automatically diagrammed according to the user's preference, and therefore, may possibly allow the user to more easily spot or identify certain associations between or patterns in the semi-structured data 110-118, 120-128, and 130-133 that otherwise would not be identified had the semi-structured data 110-118, 120-128, and 130-133 been arranged randomly or arranged in a different predefined graphical layout.

Figure 5A:
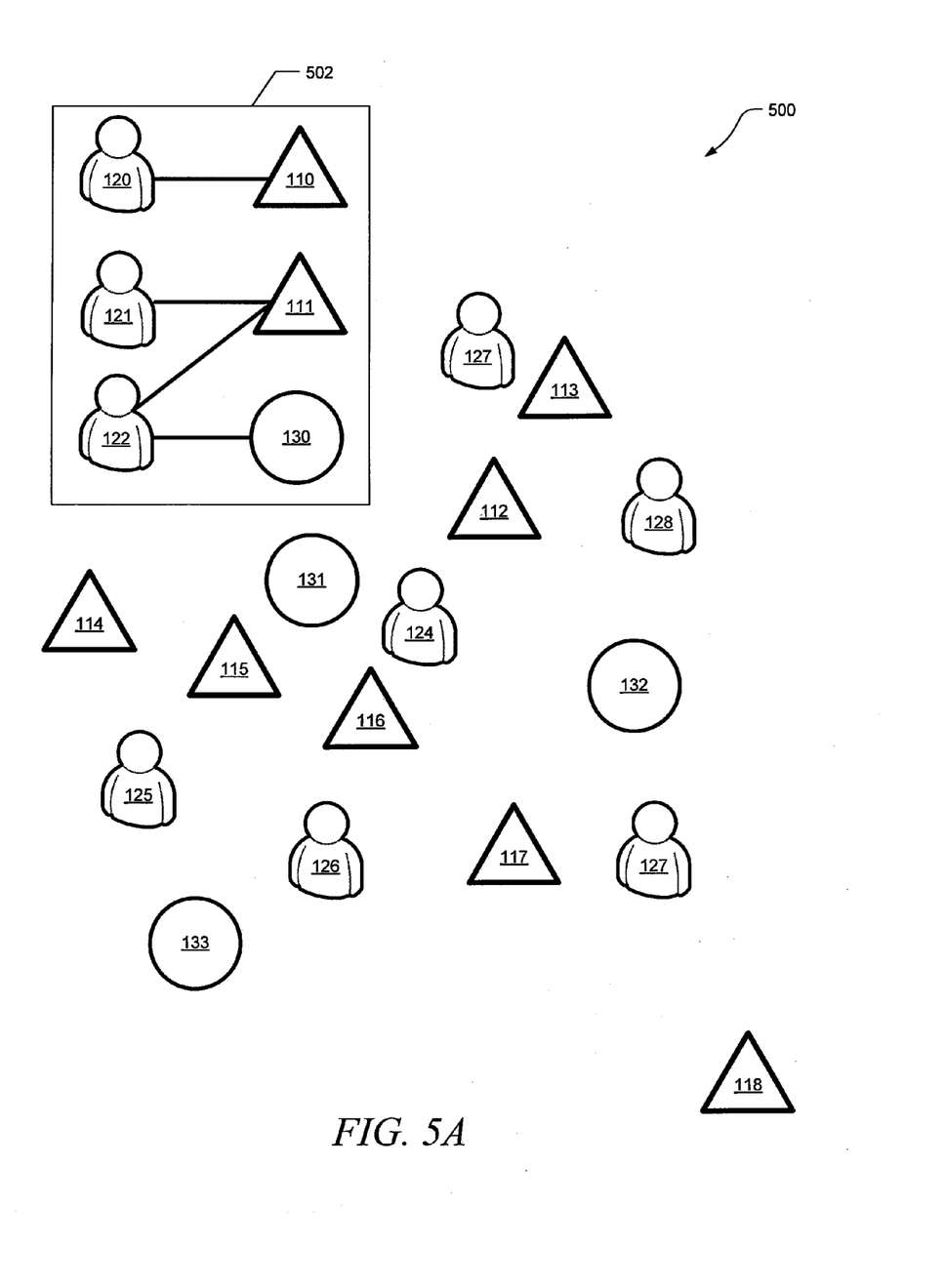
FIGS. 5A and 5B are graphical user interfaces illustrating the automatic organization of semi-structured data based on a user-defined graphical layout, consistent with another example embodiment.
Figure 5B:
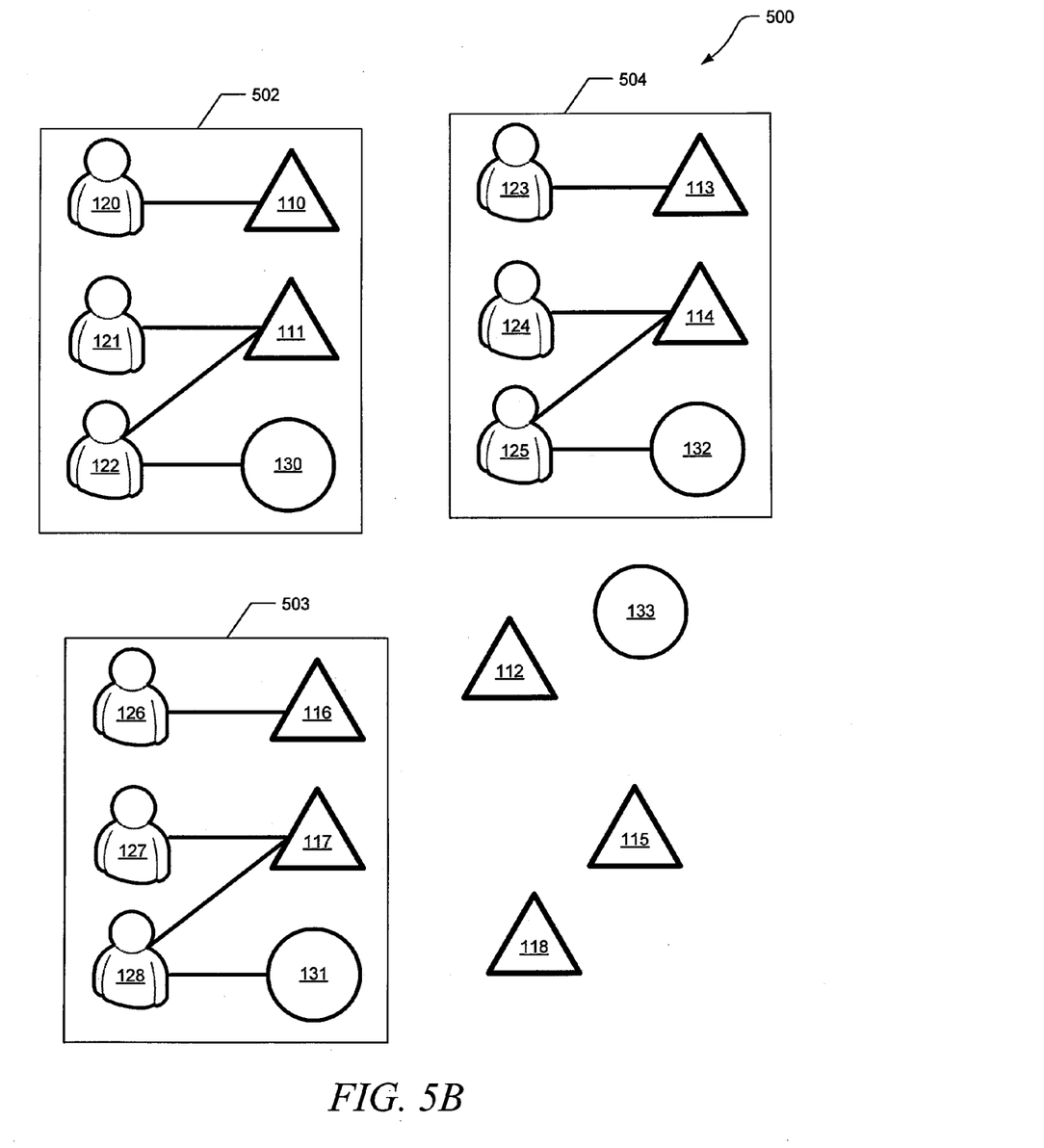

FIGS. 5A and 5B are graphical user interfaces 500 illustrating the automatic organization of semi-structured data based on a user-defined graphical layout, consistent with another example embodiment. As depicted in FIG. 5A, semi-structured data 110-118, 120-128, and 130-133 are represented by graphical items in a graphical user interface 500. Initially, the graphical layout of the semi-structured data 110-118, 120-128, and 130-133 is such that the semi-structured data 110-118, 120-128, and 130-133 is randomly positioned. However, a user using the graphical user interface 500 can define a particular graphical layout 502 of a number of semi-structured data. In this example, the user can reposition the semi-structured data 110-111, 120-122, and 130 such that they are aligned along three rows and two columns, as depicted in the graphical layout 502.

In addition to repositioning semi-structured data 110-111, 120-122, and 130, the user may further define associations between this selected number of semi-structured data 110-111, 120-122, and 130, consistent with an example embodiment. As depicted in FIG. 5A, the user may define an association between semi-structured data 110 and 120, between semi-structured data 111 and 121, between semi-structured data 111 and 122, and between semi-structured data 130 and 122. The lines connecting the semi-structured data 110 and 120, 111 and 121, 111 and 122, and 130 and 122, are graphical representations of the associations between the semi-structured data 110 and 120, 111 and 121, 111 and 122, and 130 and 122.

With the receipt of the user input, which defines the graphical layout 502, a number of other semi-structured data 126-128, 116-117, 131, 123-125, 113-114, and 132 are identified as having similar properties as the semi-structured data 110-111, 120-122, and 130 defined in the user input.

Upon identification of these other number of semi-structured data 126-128, 116-117, 131, 123-125, 113-114, and 132, the data exploration module, for example, then rearranges the graphical layouts of these semi-structured data 126-128, 116-117, 131, 123-125, 113-114, and 132 to match the graphical layout 502 of the semi-structured data 110-111, 120-122, and 130 defined in the user input. In the rearrangement, the relative positions between the graphical items representing the number of semi-structured data 110-111, 120-122, and 130 are identified. As depicted in FIG. 5B, the graphical items representing semi-structured data 126-128, 116-117, 131, 123-125, 113-114, and 132 are then positioned to correspond to the relative positions such that the graphical layouts 503 and 504 of semi-structured data 126-128, 116-117, 131, 123-125, 113-114, and 132 match the graphical layout 502 defined by the user.

In a further embodiment, associations between the semi-structured data 110-111, 120-122, and 130 are stored as properties of the semi-structured data 110-111, 120-122, and 130. The data exploration module, which can access such properties, can render a graphical representation of the associations between the other number of semi-structured data 126-128, 116-117, 131, 123-125, 113-114, and 132 to match the associations between semi-structured data 110-111, 120-122, and 130. In the embodiment depicted in FIG. 5B, the graphical representations are lines connecting the semi-structured data 110-111, 120-122, 130, 126-128, 116-117, 131, 123-125, 113-114, and 132.

As a result, by simply defining the graphical layout 502 of a relatively small subset of semi-structured data 110-111, 120-122, and 130, the data exploration module can automatically organize all other semi-structured data 126-128, 116-117, 131, 123-125, 113-114, and 132 having similar properties to match the graphical layout 502. As a result, almost all of the semi-structured data 110-111, 120-122, 130, 126-128, 116-117, 131, 123-125, 113-114, and 132 are automatically diagramed according to the user's preference, and therefore, may possibly allow the user to more easily spot or identify certain associations between or patterns in the semi-structured data 110-118, 120-128, and 130-133 that otherwise would not be identified had the semi-structured data 110-118, 120-128, and 130-133 been arranged randomly or arranged in a different predefined graphical layout.

Figure 6:
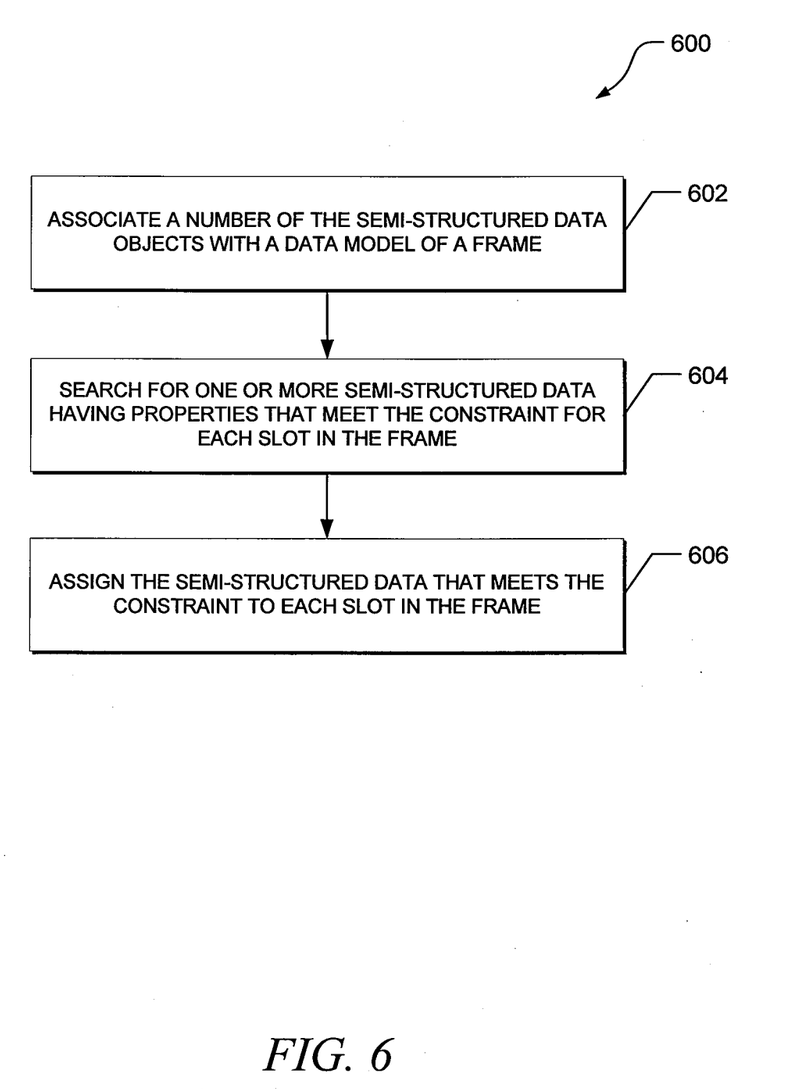
FIG. 6 depicts a flow diagram of a detailed method, in accordance with one example embodiment, for identifying a different number of semi-structured data having similar properties.

FIG. 6 depicts a flow diagram of a detailed method 600, in accordance with one example embodiment, for identifying a different number of semi-structured data having similar properties. In an example embodiment, the method 600 may be implemented by the data exploration module 206 and employed in the computing device 200 depicted in FIG. 2. Initially, an input from a user defining a graphical layout of a number of semi-structured objects is received. Referring to 602 of FIG. 6, the data exploration module, for example, associates the number of semi-structured data defined by the user with a data model of a frame that is comprised of slots. As used herein, a "frame" is a data-structure for representing a graphical layout of a number of semi-structured data defined by a user. Such a frame may be comprised of a network of nodes and relations. In one example, the upper nodes of a frame may be fixed, and such nodes may represent things that are true about the graphical layout. The lower nodes may have "slots" that are filled by the number of semi-structured data defined by a user. As used herein, a "slot" refers to a node of the frame that is associated with one or more semi-structured data. Each slot in a frame can have or specify one or more constraints, which define limitations of semi-structured data that can be associated with the slots. That is, a constraint can be assigned to a slot specifying a condition that the semi-structured data needs to fulfill in order to fill the slot.

In one embodiment, the constraints can be based on one or more properties of the semi-structured data. One example of a constraint can specify that only semi-structured data having certain properties that match the constraint can be associated with a particular slot. As an example, the constraint can specify only semi-structured data having values X equal to the value "1" (or X=1). Another example of a constraint may specify that only semi-structured data having properties exceeding a certain threshold can be associated with a particular slot. As an example, such a constraint can specify only semi-structured data having values X greater than the value of "1" (or X>1). Yet another example of a constraint may specify that only semi-structured data having properties below a certain threshold can be associated with a particular slot. As an example, such a constraint can specify only semi-structured data having values X less than the value of "1" (or X<1).

At 604, a search is conducted for one or more semi-structured data having one or more properties that meet the constraint assigned to each slot. In one embodiment, the search may be conducted by crawling within the semi-structured data. Particularly, each object may have association with one or more other semi-structured data. In the search, the association of one semi-structured data can be followed to identify the other semi-structured data that are associated with the semi-structured data. By crawling through the semi-structured data, many or all the properties of semi-structured data can be found and tested to identify whether the semi-structured data can be associated with a particular slot in the frame.

Once one or more semi-structured data are found that meet the constraint for a particular slot, the semi-structured data are then assigned to the slot at 606. This process is repeated by crawling through all the semi-structured data such that each semi-structured data is tested to identify whether it can be associated with a particular slot in the frame.

Figure 7:
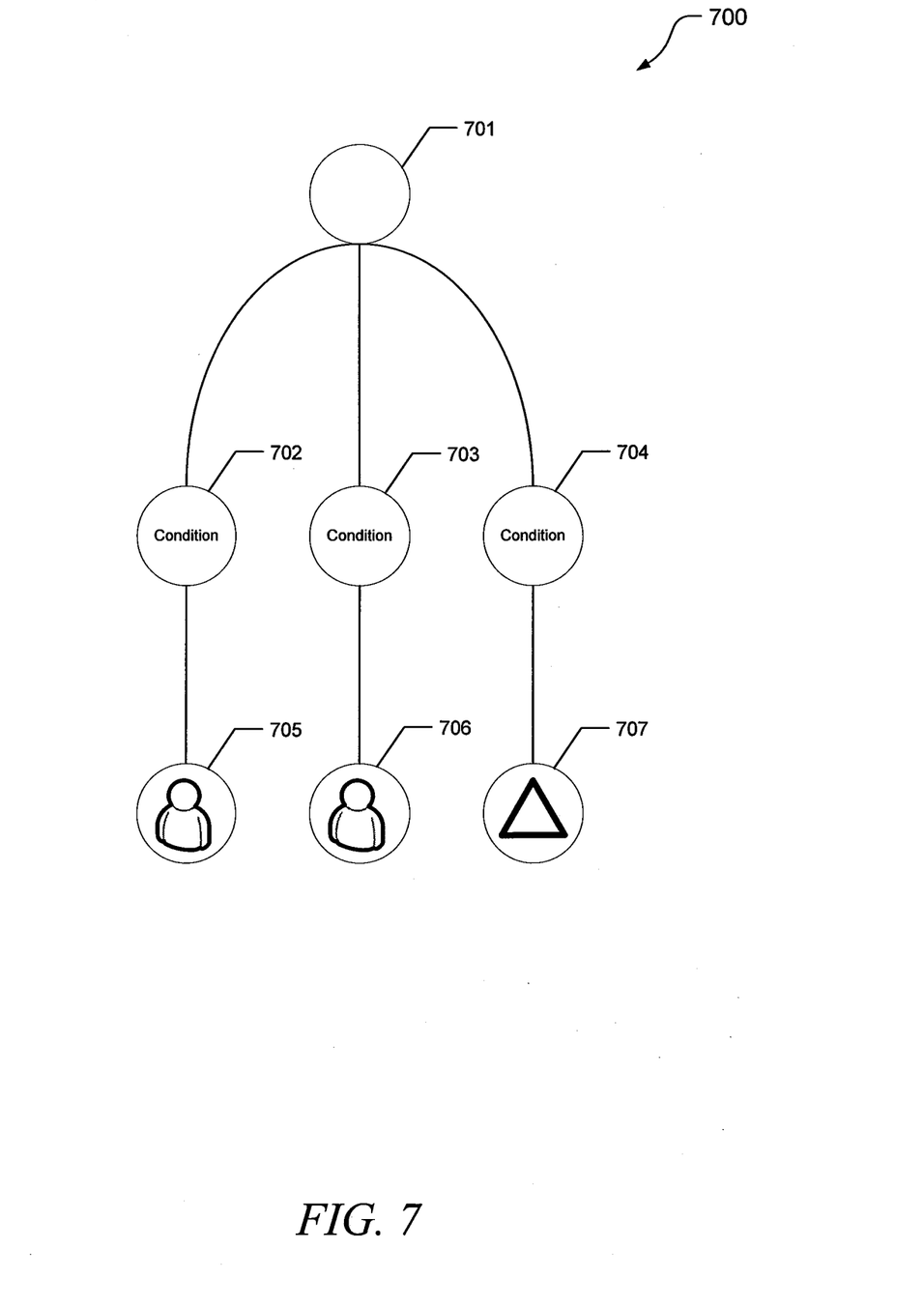
FIG. 7 is a diagram depicting a data model of a frame having a number of slots, in accordance with an example embodiment.

FIG. 7 is a diagram depicting a data model of a frame 700 having a number of slots, in accordance with an example embodiment. The frame 700 can be depicted as a network of nodes 702-707 and relations. The nodes 702-707 can be associated with a variety of information regarding the graphical layout defined by a user. In the example embodiment depicted in FIG. 7, each lower node 705, 706, or 707 has a slot that is filled by one or more semi-structured data. Each slot in the frame 700 can have or specify one or more constraints. The upper nodes 702-704 of the frame 700 define the conditions assigned to the slots. In particular, the constraint defined in node 702 is assigned to the slot associated with node 705. The constraint defined in node 703 is assigned to the slot associated with node 706. The constraint defined in node 704 is assigned to the slot associated with node 707.

Accordingly, the constraint assigned to node 702 specifies a particular condition that the semi-structured data need to fulfill in order to fill the slot associated with node 705. Similarly, the constraint assigned to node 703 specifies a particular condition that the semi-structured data need to fulfill in order to fill the slot associated with node 705. The constraint assigned to node 704 specifies a particular condition that the semi-structured data need to fulfill in order to fill the slot associated with node 707.

In addition to conditions and slots, the frame 700 can have additional nodes (not shown) that are associated with other information, such as associations between the semi-structured data, relative positions of the graphical items, types of graphical items assigned to semi-structured data, properties of graphical items (e.g., color, size, line width, and other properties), and other information associated with a graphical layout.

Figure 8:
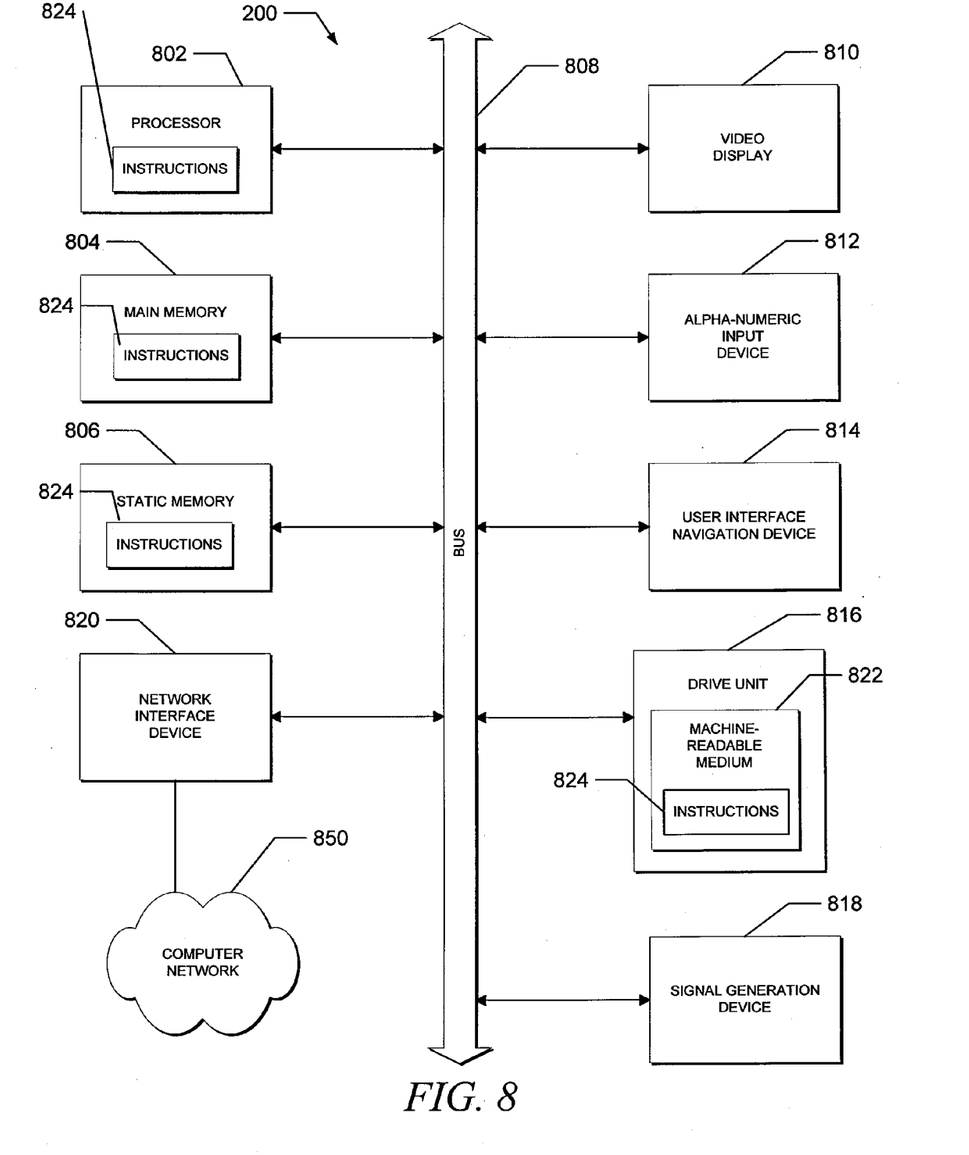
FIG. 8 depicts a block diagram of a machine in the example form of a processing system within which may be executed a set of instructions for causing the machine to perform any one or more of the methodologies discussed herein.

FIG. 8 depicts a block diagram of a machine in the example form of a processing system 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 200 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The processing system 200 may further include video display unit 810 (e.g., a plasma display, a liquid crystal display (LCD) or a cathode ray tube (CRT)). The processing system 200 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by processing system 200, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 200) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for graphical layout of semi-structured data may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
   accessing semi-structured data that have respective properties;
   rendering the semi-structured data as graphical items on a graphical user interface;

receiving a user input repositioning a first number of the graphical items in the graphical user interface, the first number of the graphical items representing a first subset of the semi-structured data;

identifying connections between members of the first subset of the semi-structured data;

automatically determining a user-defined graphical layout based on the repositioning of the first number of the graphical items in combination with the identified connections of the first subset of the semi-structured data, the determining of the user-defined graphical layout comprising identifying, from the repositioning of the first number of the graphical items, relative positions between the first number of graphical items;

automatically identifying a second number of the graphical items representing a second subset of the semi-structured data having connections similar to the identified connections between the members of the first subset of the semi-structured data; and automatically providing a graphical layout of the identified second number of the graphical items based on the user-defined graphical layout, the providing of the graphical layout comprising positioning the second number of graphical items to correspond to the identified relative positions.

2. The method of claim 1, wherein the identification of the second subset of the semi-structured data comprises:

associating the first subset of the semi-structured data with a data model of a frame that comprises slots, each slot having a constraint based on at least one of the properties;

searching within the semi-structured data for at least one semi-structured datum having a property that meets the constraint of the each slot; and assigning the at least one semi-structured datum that meets the constraint to the each slot.

3. The method of claim 2, wherein the searching within the semi-structured data comprises following associations between the semi-structured data to locate the at least one semi-structured datum.

4. The method of claim 1, further comprising rendering a graphical representation of the connections between members of the identified second subset of the semi-structured data.

5. The method of claim 4, wherein the graphical representation of the connections between the members of the identified second subset of the semi-structured data comprises rendering the association as a line segment.

6. The method of claim 1, wherein the semi-structured data comprise Extensible Markup Language (XML) data.

7. The method of claim 1, wherein the connections between the semi-structured data are indicated by a tag identifying another semi-structured object.

8. The method of claim 1, wherein the user input repositioning the first number of the graphical items in the graphical user interface comprises the graphical items being dragged with a mouse to new positions.

9. A non-transitory machine-readable medium that stores instructions, which, when performed by a machine, cause the machine to perform operations comprising:

accessing semi-structured data that have respective properties;

rendering the semi-structured data as graphical items on a graphical user interface;

receiving a user input repositioning a first number of the graphical items in the graphical user interface, the first number of the graphical items representing a first subset of the semi-structured data;

identifying connections between members of the first subset of the semi-structured data;

automatically determining a user-defined graphical layout based on the repositioning of the first number of the graphical items in combination with the identified connections of the first subset of the semi-structured data, the determining of the user-defined graphical layout comprising identifying, from the repositioning of the first number of the graphical items, relative positions between the first number of graphical items;

automatically identifying a second number of the graphical items representing a second subset of the semi-structured data having connections similar to the identified connections between the members of the first subset of the semi-structured data; and automatically providing a graphical layout of the identified second number of the graphical items based on the user-defined graphical layout, the providing of the graphical layout comprising positioning the second number of graphical items to correspond to the identified relative positions.

10. The non-transitory machine-readable medium of claim 9, wherein the identification of the second subset of the semi-structured data comprises:

associating the first subset of the semi-structured data with a data model of a frame that comprises slots, each slot having a constraint based on at least one of the properties;

searching within the semi-structured data for at least one semi-structured datum having a property that meets the constraint of the each slot; and assigning the at least one semi-structured datum that meets the constraint to the each slot.

11. The non-transitory machine-readable medium of claim 10, wherein the searching within the semi-structured data comprises following associations between the semi-structured data to locate the at least one semi-structured datum.

12. The non-transitory machine-readable medium of claim 9, wherein the operations further comprise rendering a graphical representation of the connections between members of the identified second subset of the semi-structured data.

13. A computing device comprising:

at least one processor; and a memory in communication with the at least one processor, the memory being configured to store a data exploration module that is executable by the at least one processor, the data exploration module having instructions that when executed by the at least one processor, cause operations to be performed, the operations comprising:

accessing semi-structured data that have respective properties;

rendering the semi-structured data as graphical items on a graphical user interface;

receiving a user input repositioning a first number of the graphical items in the graphical user interface, the first number of the graphical items representing a first subset of the semi-structured data;

identifying connections between members of the first subset of the semi-structured data;

automatically determining a user-defined graphical layout based on the repositioning of the first number of the graphical items in combination with the identified connections of the first subset of the semi-structured data, the determining of the user-defined graphical layout comprising identifying, from the repositioning of the first number of the graphical items, relative positions between the first number of graphical items;

automatically identifying a second number of the graphical items representing a second subset of the semi-structured data having connections similar to the identified connections between the members of the first subset of the semi-structured data; and automatically providing a graphical layout of the identified second number of the graphical items based on the user-defined graphical layout, the providing of the graphical layout comprising positioning the second number of graphical items to correspond to the identified relative positions.

14. The computing device of claim 13, wherein the identification of the second subset of the semi-structured data comprises:

associating the first subset of the semi-structured data with a data model of a frame that comprises slots, each slot having a constraint based on at least one of the properties;

searching within the semi-structured data for at least one semi-structured datum having a property that meets the constraint of the each slot; and assigning the at least one semi-structured datum that meets the constraint to the each slot.

15. The computing device of claim 14, wherein the searching within the semi-structured data comprises following associations between the semi-structured data to locate the at least the semi-structured datum.

16. The computing device of claim 13, the operations further comprising rendering a graphical representation of the connections between members of the identified second subset of the semi-structured data.

17. The computing device of claim 13, wherein the semi-structured data are a form of data having an irregular schema.

* * * * *